United States Patent
Morel et al.

(10) Patent No.: US 9,600,753 B2
(45) Date of Patent: Mar. 21, 2017

(54) METHOD FOR PRODUCING A PATTERN IN RELIEF IN A THIN PLASTIC CARD

(71) Applicant: OBERTHUR TECHNOLOGIES, Colombes (FR)

(72) Inventors: Yvonnic Morel, Colombes (FR); Julie Kerhomen, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/443,512

(22) PCT Filed: Nov. 14, 2013

(86) PCT No.: PCT/FR2013/052746
§ 371 (c)(1),
(2) Date: May 18, 2015

(87) PCT Pub. No.: WO2014/076428
PCT Pub. Date: May 22, 2014

(65) Prior Publication Data
US 2015/0339562 A1  Nov. 26, 2015

(30) Foreign Application Priority Data
Nov. 16, 2012  (FR) ..................... 12 60901

(51) Int. Cl.
*G06K 19/02* (2006.01)
*B23K 26/36* (2014.01)
(Continued)

(52) U.S. Cl.
CPC .......... *G06K 19/02* (2013.01); *B23K 26/0057* (2013.01); *B23K 26/365* (2013.01);
(Continued)

(58) Field of Classification Search
CPC .......... B41M 5/267; B41M 5/26; B41M 3/14; B29C 2035/0838; B23K 26/4065;
(Continued)

(56) References Cited

U.S. PATENT DOCUMENTS

| | | | | |
|---|---|---|---|---|
| 3,607,273 A | * | 9/1971 | Kinney | ................ B41M 5/36 430/290 |
| 4,507,346 A | | 3/1985 | Maurer et al. | |

(Continued)

FOREIGN PATENT DOCUMENTS

| | | |
|---|---|---|
| EP | 0 308 904 A2 | 3/1989 |
| FR | 2 525 007 A1 | 10/1983 |

(Continued)

OTHER PUBLICATIONS

"Optical Document Security, Plastic Substrates ED—Rudolf L van Renesse", Jan. 1, 2005, Optical Document Security; [Artech House Optoelectronics], Artech House, Boston, Mass. [U.A.J. pp. 84-89, XP002698880, ISBN: 978-1-58053-258-7 p. 85, paragraph 3.3.1. 1—p. 87.

(Continued)

*Primary Examiner* — Claude J Brown
(74) *Attorney, Agent, or Firm* — Young & Thompson

(57) ABSTRACT

A method for producing a pattern in relief in a thin plastic card, includes the following steps: producing a stack of layers including, in the following order: a transparent layer, a special layer, a black surface, and a substrate layer, and drawing the pattern by a laser through the transparent layer.

15 Claims, 2 Drawing Sheets

(51) Int. Cl.
  *B29C 47/04* (2006.01)
  *B29C 47/06* (2006.01)
  *B23K 26/40* (2014.01)
  *B23K 26/00* (2014.01)
  *B41M 5/26* (2006.01)
  *B42D 25/41* (2014.01)
  *B42D 25/324* (2014.01)
  *B29L 17/00* (2006.01)
  *B29K 69/00* (2006.01)
  *B29K 27/06* (2006.01)
  *B41M 3/14* (2006.01)

(52) U.S. Cl.
  CPC ........ *B23K 26/4065* (2013.01); *B29C 47/043* (2013.01); *B29C 47/065* (2013.01); *B41M 5/267* (2013.01); *B42D 25/324* (2014.10); *B42D 25/41* (2014.10); *G06K 19/022* (2013.01); *B29K 2027/06* (2013.01); *B29K 2069/00* (2013.01); *B29L 2017/00* (2013.01); *B41M 3/14* (2013.01)

(58) Field of Classification Search
  CPC .............. B23K 26/0057; G06K 19/022; B29L 2017/00; B42D 25/41; B42D 25/324
  USPC ......................................................... 235/488
  See application file for complete search history.

(56) References Cited

U.S. PATENT DOCUMENTS

| | | | |
|---|---|---|---|
| 5,005,872 A * | 4/1991 | Lass | B42D 25/00 283/117 |
| 5,122,813 A | 6/1992 | Lass et al. | |
| 2003/0234286 A1* | 12/2003 | Labrec | B41M 3/14 235/380 |
| 2006/0145468 A1 | 7/2006 | Plaschka et al. | |
| 2008/0233404 A1* | 9/2008 | Wolk | B29C 59/022 428/411.1 |
| 2010/0009171 A1 | 1/2010 | Greb et al. | |
| 2011/0303112 A1* | 12/2011 | Vere | B41M 3/14 101/488 |

FOREIGN PATENT DOCUMENTS

| | | |
|---|---|---|
| WO | 2004/009371 A1 | 1/2004 |
| WO | 2008/083726 A1 | 7/2008 |

OTHER PUBLICATIONS

International Search Report, dated Jan. 17, 2014, from corresponding PCT application.

\* cited by examiner

METHOD FOR PRODUCING A PATTERN IN RELIEF IN A THIN PLASTIC CARD

BACKGROUND OF THE INVENTION

Field of the Invention

The present invention relates to a process for producing a relief pattern in a thin plastic card such as a bank card.

Description of the Related Art

In the field of plastic cards, it is known to produce rigid thin plastic cards by joining layers of polyvinyl chloride (PVC) or polycarbonate (PC).

It is known to produce such thin plastic cards, in various formats, so as to obtain portable cards. These cards may be equipped with a unit for storing information, a unit for processing information (microcircuit) or even be able to communicate with an external electronic or information-processing device via a contact or contactless means of communication.

These cards are characterized by a substantially planar shape limited by centimeter-sized dimensions and by a thickness that is most often smaller than 1 mm, such as defined by the standard ISO 7816.

Such thin plastic cards are used as bank cards, identity cards, medical cards, badges, phone cards, etc.

Many reasons may be used to justify the need to produce at least one relief pattern in such a thin plastic card. A relief element enables differentiation in that a card containing a relief is easier to locate, both by eye and by touch. A relief makes it possible, for example by means of Braille inter alia, for a visually impaired or blind person to identify the card. The presence of a relief may even allow an imprint to be taken. This has, for example, for a long while been used to record the details of a debtor during a bank payment, a bank card belonging to said debtor and comprising said details in relief being pressed against a pressure sensitive receipt, such as carbon paper receipt. A relief also allows a security level 1 device (i.e. a security device that does not require a tool for verification) to be added to a thin plastic card.

A plurality of methods are already known allowing a relief pattern to be produced in such thin plastic cards.

According to a first method, a relief pattern is produced by depositing a lacquer on a thin plastic card. This method is implemented by screen printing. The result obtained is limited to very small thicknesses, the relief not exceeding 100 μm relative to the external surface of the thin plastic card.

According to another method, a relief pattern is produced by depositing ink on a thin plastic card. This method is implemented by inkjet printing, also referred to as drop-on-demand printing. The result obtained is limited to very small thicknesses, the relief not exceeding 100 μm relative to the external surface of the thin plastic card.

According to another method, a relief pattern is produced by carbonizing a surface layer (for example made of polycarbonate) of a thin plastic card. This method is typically implemented by means of a laser, typically at a wavelength of 1064 nm. The relief thus obtained is hardly any higher, not exceeding 140 μm relative to the external surface of the thin plastic card.

According to another method, called embossing, a relief is obtained mechanically by means of a stamp applied to one side of a thin plastic card so as to push out material and cause, by deformation, a positive relief to appear on the other side. This method is typically implemented by means of a system comprising at least one stamp paired with a die. The relief thus obtained is clearly much higher than that obtained with the other methods described above, and may reach 400 to 500 μm relative to the external surface of the thin plastic card. However, this method has at least two drawbacks relating to the use of stamps. A first drawback is to limit the choice of possible patterns to a given set of stamps/dies. Such a method is thus typically limited to a given set of characters, in a given typeface, for which stamps exist. In the absence thereof, for any other pattern, it is advisable to develop a suitable stamp/die. A second drawback is that penetration of the stamp causes a negative of the same relief to appear on the side opposite the positive relief. This negative relief makes the surface opposite a relief pattern unusable or hardly usable. Thus a printing in such a zone will become unreadable or hardly readable once impressed by the stamp.

BRIEF SUMMARY OF THE INVENTION

The present invention remedies these various drawbacks by providing a process for producing a relief in a thin plastic card, allowing a substantial relief thickness (at least larger than 150 μm) to be achieved while increasing the freedom of choice of the patterns produced.

The subject of the invention is a process for producing a relief pattern in a thin plastic card, comprising the following steps: producing a superposition of layers comprising, in order: a transparent layer; a special layer adapted to change under the effect of a laser beam; a black surface; and a substrate layer; and, drawing by means of a laser said pattern through the transparent layer.

The expression "to change" may be understood to mean that the special layer may undergo a structural deformation that may be likened to a swelling.

According to another feature of the invention said special layer comprises at least two layers the thermal expansion coefficients of which are different.

In particular, the thermal expansion coefficients have at least a ratio of 1 to 10.

By way of example, it is possible to form the special layer from a film of polymethyl methacrylate and a film of polyethylene terephthalate (PET) the thermal expansion coefficients of which are $70.2 \times 10^{-12}$/K and $738 \times 10^{-12}$/K, respectively (i.e. in imperial units 0.000039 and 0.000410 microinch per inch per degree Fahrenheit).

According to another feature of the invention, said special layer comprises a stack of hundreds of reflective optical films alternating a film having a high reflectance index and a film having a low reflectance index.

According to another feature of the invention, the relative thicknesses of said reflective optical films are set so as to form a quarter-wave interference filter.

According to another feature of the invention, said special layer is formed by coextruding the reflective optical films.

According to another feature of the invention, the black surface is formed by a black printing on the surface, facing the special optical layer, of a substrate layer that is not black.

According to another feature of the invention, the black surface is formed by the surface, facing the special layer, of a substrate layer the bulk of which is colored black.

According to another feature of the invention, the laser comprises a YAG laser using a wavelength of 1064 nm.

According to another feature of the invention, the laser functions in a pulsed mode and with vector type graphical elements.

According to another feature of the invention, the power of the laser is comprised between 5 and 30 W and preferably between 10 and 20 W.

The invention also relates to a card made of plastic comprising:
- a transparent layer;
- a special layer adapted to change under the effect of a laser beam;
- a black surface; and
- a substrate layer.

In particular, the card made of plastic furthermore comprises a relief pattern produced by means of a laser through the transparent layer.

BRIEF DESCRIPTION OF THE DRAWINGS

Other features, details and advantages of the invention will become more clearly apparent from the detailed description given below, by way of indication, with regard to the appended drawings, in which.

DETAILED DESCRIPTION OF THE PREFERRED EMBODIMENTS

Figure 1:
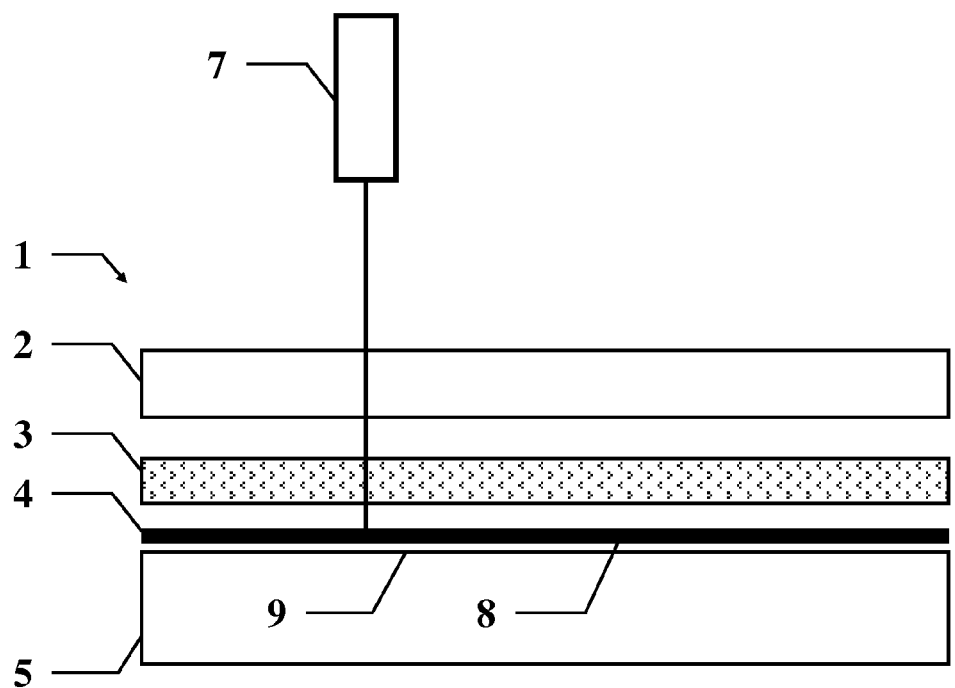
FIG. 1 shows a cross-sectional view of a superposition of layers forming a thin plastic card 1 according to the invention, able to produce a single relief, according to a first embodiment.
Figure 2:
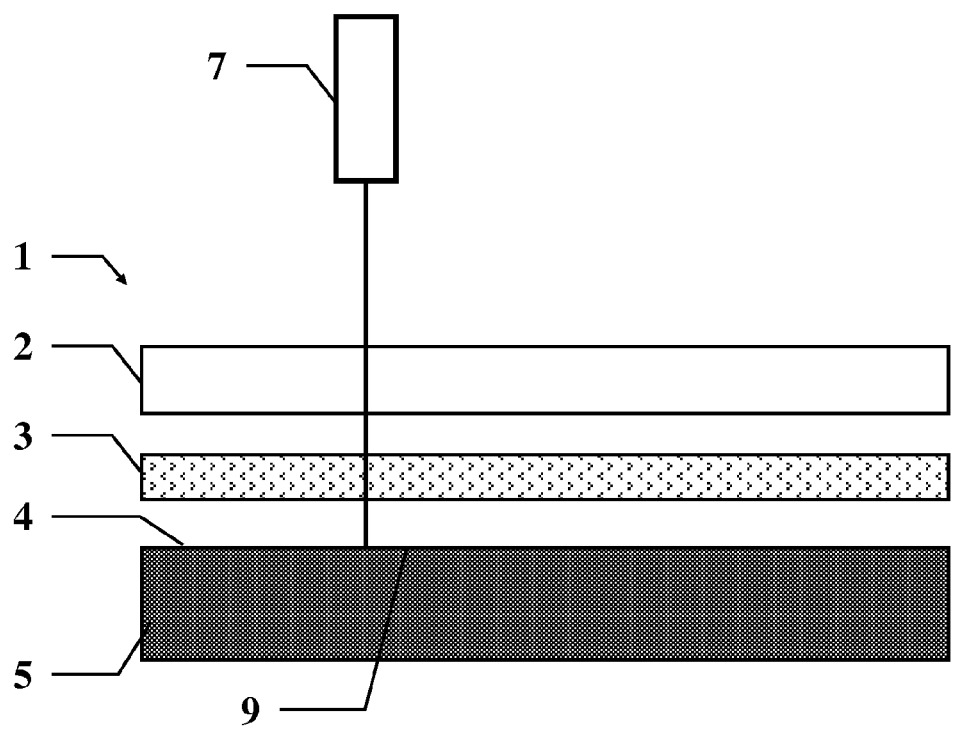
FIG. 2 shows a cross-sectional view of a superposition of layers forming a thin plastic card 1 according to the invention, able to produce a double relief, according to a second embodiment.

FIG. 1 shows a possible environment for implementing the process according to the invention. Shown is a cross-sectional view of a superposition of layers 2-5 forming a thin plastic card 1.

The invention is implemented by way of an interaction between a special layer 3 and a black surface 4 under the action of a laser beam 7, the layer 3 and surface 4 being placed facing and making contact with each other.

A thin plastic card 1 is typically produced by stacking, in order, at least the following layers, from top to bottom in the plane of FIG. 1: a transparent layer 2, a special layer 3, a black surface 4 and a substrate layer 5.

Figure 4:
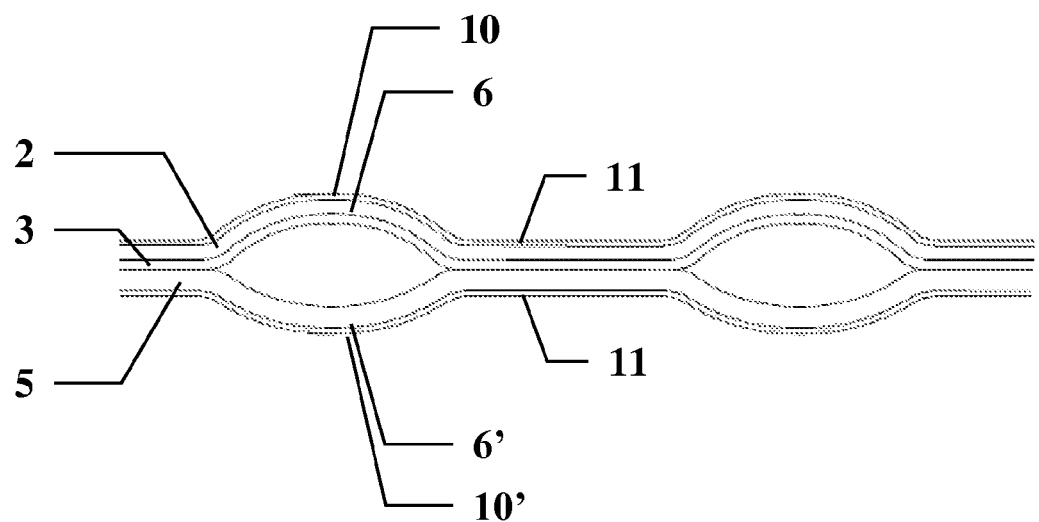
FIG. 4 shows a cross-sectional view of the result of a double relief.

Other layers may also be added. Thus, said superposition of layers 2-5 may, for example, also comprise, placed symmetrically relative to the substrate layer 5, from top to bottom, a second black surface, a second special layer and a second transparent layer. It is also possible, such as illustrated in FIG. 4, to add one or more protective overlays 11, in order for example to protect a printing produced on the external surface of the transparent layer 2.

Whatever the organization of the superposition and the number and topology of the layers thus stacked, it is advisable for the black surface 4 to make contact with the special layer 3 and for any layer 2 placed between the special layer 3 and the exterior of the thin plastic card 1 to be transparent to the laser beam 7 used to activate the invention. It remains possible to produce a printing on or under the transparent layer 2. However, this printing must not cover the zones in which it is desired to produce a relief or, if this printing does cover these zones, it must not make them opaque or be black in color.

Once stacked into a superposition, the various layers 2-5 are joined together, typically by hot rolling, using a conventional process, in order to form a thin plastic card 1. This joining step is typically carried out in a first manufacturing phase, also referred to as the production phase, in which identical thin plastic cards 1 are mass produced, in a factory, with mass production means.

By way of indication, the respective thicknesses may be 200 µm for the transparent layer 2, 150 µm for the special layer 3 and 480 µm for the substrate layer. The black surface 4 is a particular layer the thickness of which is negligible with respect to the other layers 1-3, 5. This produces, after rolling, a thin plastic card 1 that is about 700 to 800 µm in thickness and preferably about 760 µm in thickness.

An actual relief pattern 6 is typically created in such a thin plastic card 1 by applying a beam of a laser 7, from the exterior of the thin plastic card 1, to the interface between the special optical layer 3 and the black surface 4, through the transparent layer 2.

Application of the beam of the laser 7 creates discretely a relief 10 in the zone of application. The relief 10 consists of a local deformation of the interface between the special layer 3 and the black surface 4, the special layer 3 debonding and separating from the black surface 4 while simultaneously deforming the transparent layer 2 placed opposite. The latter deformation effectively creates a relief pattern 6 that protrudes perceptibly from the exterior of the thin plastic card 1.

The shape of the relief 10 pattern 6 thus produced follows exactly, in the plane of the thin plastic card 1, the path traveled by the beam of the laser 7. It is thus possible to draw, by means of said laser beam, a wide variety of patterns 6. This way of producing the relief 10 by drawing by means of a laser 7 thus allows a large freedom of choice of the shape of the relief pattern 6.

This drawing step, which effectively expresses the relief pattern 6, is typically carried out in a second manufacturing phase, also referred to as the personalization phase, which is carried out card by card. This personalization step, which is carried out with batch production means, may thus be carried out in the workshop of a concessionaire, on thin plastic cards 1 mass produced beforehand.

The average relief 10 amplitude achievable according to the invention may exceed 150 µm and reach 900 µm relative to the surface of the thin plastic card 1. Depending on the thickness of the card, it is possible to reach 1.4 mm and it is even possible to reach values of 3.3 mm or more.

The special layer 3 is typically formed from plastics such as polyvinyl chloride (PVC).

As is known, it is possible to produce multilayer optical films (MOFs) that have advantageous visual properties, especially in terms of color.

The principle, which is recalled here as a matter of interest, consists in stacking many, possibly hundreds or more, reflective optical films. Each reflective optical film typically consists of a thin reflective film of PVC, or even of polycarbonate (PC), or indeed of polyester.

The films of said stack alternate between a film having a high reflectance index and a film having a low reflectance index.

Thus said stack forms an interference filter. It is possible to adjust the spectrum of this filter by adjusting the relative thicknesses of said reflective optical films.

Knowing, for example, that the wavelength filtered by a pair of films comprising a film having a high reflectance index and a film having a low reflectance index is set by their thickness, it is possible to synthesize a filter having a set spectrum. It is thus advantageously possible to form a quarter wave interference filter.

The one or more frequencies selected for this filter determine the color of the special layer 3 thus synthesized. This color also depends on the color of the material located behind the film, the filter reflecting some light and transmitting some light.

Each pair of (high index/low index) films is tuned thicknesswise so as to reflect, by constructive interference, light in the vicinity (±20 nm) of a given wavelength. Applying a carefully designed thickness profile to the pairs of films in the stack extends the band of reflection to a desired spectrum of wavelengths. The reflected intensity increases with the number of pairs of films tuned to this wavelength and with the difference between the high reflectance index and the low reflectance index of the two materials forming a high index film and a low index film, respectively.

Advantageously, the films having a high reflectance index and the films having a low reflectance index are highly specular and reflective.

The special layer 3 is then formed by coextruding the reflective optical films of said stack.

An optional step of stretching the special layer 3 may be applied in order to further modify the optical properties of said special layer 3.

The special layer 3 is thus physically stretched in order to orient molecularly at least one set of films, in order to induce a birefringence in these films. This birefringence provides most of the difference in reflectance index between the films of high and low index. When the special layer 3 is stretched biaxially in two directions located in its plane, the reflectance indices in this plane increase and the special layer 3 is able to reflect two polarization states similarly to a mirror. When the special layer 3 is stretched uniaxially in a single direction located in the plane, the special layer 3 is able to reflect effectively one polarization state. When, in addition, the reflectance index of the film of low reflectance index corresponds to the reflectance index of the film of high reflectance index in the unstretched direction, after uniaxial stretching, then the special layer 3 transmits substantially all of this polarization state, and a reflective layer that acts as a linear polarizer is obtained. The materials of the films and the stretching conditions may be chosen in order to set the out-of-plane reflectance indices so as to suppress Brewster's angle. Thus high reflectivities, higher than 95%, may be achieved, for one or two polarization states, for a large viewing angles. Because differences in the optical path length of the reflected waves decrease as angle increases relative to the normal, the colors seen shift toward shorter wavelengths as viewing angle relative to the normal increases. When the special layer 3 is observed under illumination conditions promoting reflection, the reflective colors set by the optical band of reflection of the special layer 3 are revealed. When the special layer 3 is observed under illumination conditions promoting transmission through the special layer 3, colors not reflected by the special layer 3 are revealed.

It is also known to use a laser 7 to modify the optical properties of such a special layer 3. The beam of the laser 7 mainly acts by supplying heat. This supply of heat typically leads to localized melting, which increases locally the uniformity of the optical properties. Thus the laser beam may allow the respective reflectance indices of the films having a high reflectance index and of the films having a low reflectance index to be made substantially equal in locations where it is applied to the special layer 3.

The energy of the laser 7 is selectively absorbed in defined portions of the multilayer stack by materials able to absorb said laser 7, which materials are coextruded directly into the optical films. The energy thus absorbed of the beam of the laser 7 causes heating. In so doing it disorients and eliminates the birefringence of one of the sets of films of high index or low index. The birefringence being the main cause of the difference in reflectance index between the two sets of films, this significantly decreases or completely eliminates the reflectivity and thus also the reflective colors of these portions.

A contrario, multilayer optical films or MOFs may be produced that are initially transparent and that become reflective after being treated by applying the laser 7.

The action of the beam of a laser 7 may thus, depending on the initial make-up/configuration of the special layer 3, cause an optical property, such as an iridescence, to appear or disappear in locations where it is applied to the special layer 3.

The creation of a relief 10 is obtained by the action of a beam of a laser 7 on such a special layer 3 facing a black surface 4, said black surface being placed, relative to the special layer 3, on the side opposite the laser 7. This effect of production of a relief 10 was obtained to the surprise of the operators at the time.

Relief 10 results were obtained with a relief 10 amplitude at least equal to 150 μm and possibly reaching values ranging up to 900 μm. The reliefs 10 obtained with such a material are very precisely determinable in that they follow precisely the drawing produced by the beam of the laser 7. Also advantageously, the reliefs 10 obtained with such a material are durable in that they persist after the laser 7 has been removed and cooling has occurred, and remain definitively in the thin plastic card 1.

Experiments have shown that if the relief 6 is to appear it is necessary for a black surface 4 to be present making contact with and facing the surface of the special layer 3 on the side opposite the side from which the laser 7 is applied.

This black surface 4 may be produced in various ways with surprisingly different results.

In a first embodiment, illustrated in FIG. 1, said black surface 4 is formed by a black printing 8 on the surface 9 (facing the special layer 3) of a layer, such as a substrate layer 5, neighboring said special layer 3, the bulk of this layer not being black. This black printing may be produced by any printing means, such as an offset printing means, a screen printing means, etc.

Figure 3:
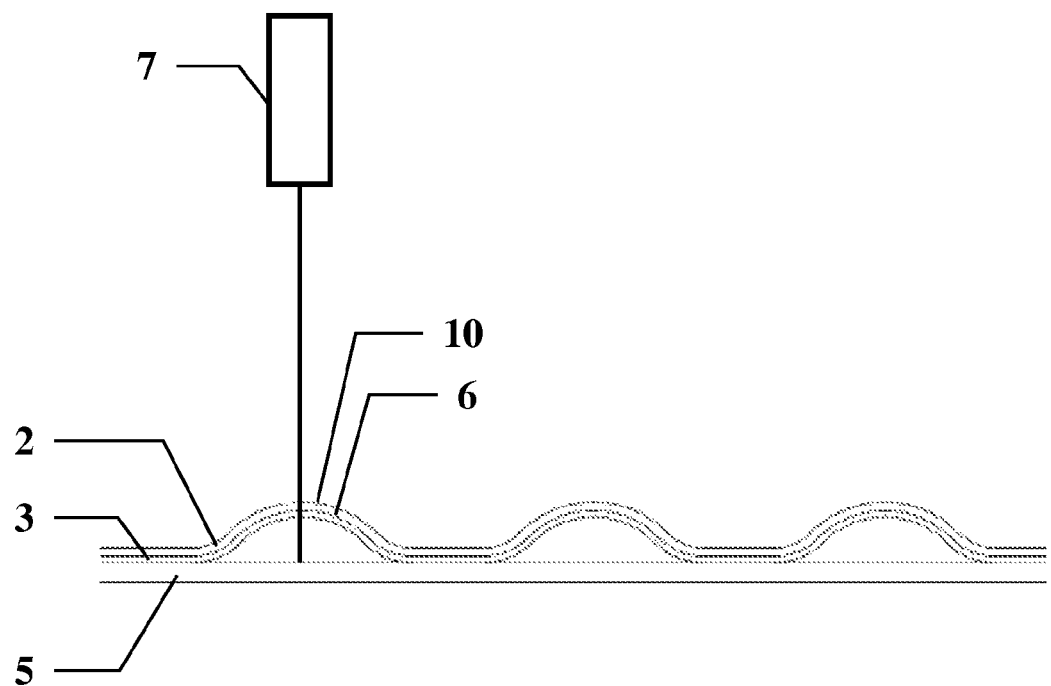
FIG. 3 shows a cross-sectional view of the result of a single relief.

According to this first embodiment, in which the black surface 4 is printed, applying the laser 7 produces, such as illustrated in FIG. 3, a deformation of the interface between the black surface 4 and the special layer 3 that tends to separate the black surface from said special layer 3. The carrier layer of the black surface 4, or substrate layer 5, does not deform. In contrast, the special layer 3 and the transparent layer 2 deform conjointly. This results in the appearance of a relief 10 pattern 6 according to the drawing produced by the beam of the laser 7. This relief 10 pattern 6 appears in the transparent layer 2.

According to a second embodiment, illustrated in FIG. 3, said black surface 4 is formed by the surface 9 (facing the special layer 3) of a substrate layer 5 the bulk of which is colored black.

According to this second embodiment, in which the black surface 4 is an integral part of the neighboring substrate layer 5, application of the laser 7 produces, here again, a deformation of the interface between the black surface 4 and the special layer 3 that tends to separate the black surface 4 from said special layer 3. In contrast to the preceding embodiment, surprisingly, the carrier layer of the black surface 4, or substrate layer 5, deforms. As above, the special layer 3 and the transparent layer 2 deform conjointly. This results, as above, in the appearance of a relief 10 pattern 6 according to the drawing produced by the beam of the laser 7. In addition, a relief 10' pattern 6' also appears simultaneously in the substrate layer 5, substantially symmetric with and in line with the preceding pattern 6. This second pattern 6' proves to be, just like the first pattern 6, defined and durable.

It has been seen that the application of a beam of a laser 7 is a factor triggering the appearance of at least one relief 10 pattern 6.

Thus, the laser 7 is typically a YAG laser using a wavelength of 1064 nm. The laser 7 advantageously functions in a pulsed mode and with vector type graphical elements. The power of the laser 7 is comprised between 5 and 30 W, and preferably between 10 and 20 W.

The invention claimed is:

1. A process for producing a relief pattern in a thin plastic card, the process comprising:
   producing a superposition of layers comprising, in order:
     a transparent layer,
     a stacked layer configured to change under the effect of a laser beam, the stacked layer comprising a stack of hundreds of reflective optical films alternating a film having a high reflectance index and a film having a low reflectance index,
     a black surface, and
     a substrate layer; and
   drawing, using a laser, said pattern through the transparent layer.

2. The process as claimed in claim 1, wherein said stacked layer comprises at least two layers the thermal expansion coefficients of which are different.

3. The process as claimed in claim 2, wherein the thermal expansion coefficients have at least a ratio of 1 to 10.

4. The process as claimed in claim 1, wherein the relative thicknesses of said reflective optical films are set so as to form a quarter-wave interference filter.

5. The process as claimed in claim 4, wherein said stacked layer is formed by coextruding the reflective optical films.

6. The process as claimed in claim 1, wherein the black surface is formed by a black printing on a facing surface, facing the stacked layer, of a substrate layer that is not black.

7. The process as claimed in claim 1, wherein the black surface is formed by a facing surface, facing the stacked layer, of a substrate layer the bulk of which is colored black.

8. The process as claimed in claim 1, wherein the laser comprises a YAG laser using a wavelength of 1064 nm.

9. The process as claimed in claim 8, wherein the laser functions in a pulsed mode and with vector-type graphical elements.

10. The process as claimed in claim 9, wherein the power of the laser is comprised between 5 and 30 W.

11. The process as claimed in claim 10, where the power of the laser is comprised between 10 and 20 W.

12. The process as claimed in claim 8, wherein the power of the laser is comprised between 5 and 30 W.

13. The process as claimed in claim 12, where the power of the laser is comprised between 10 and 20 W.

14. A card made of plastic configured to be subjected to a laser beam, the card comprising:
    a transparent layer;
    a stacked layer configured to change under the effect of a laser beam and thereby form a relief pattern, the stacked layer comprising a stack of hundreds of reflective optical films alternating a film having a high reflectance index and a film having a low reflectance index,
    a black surface; and
    a substrate layer.

15. The card made of plastic as claimed in claim 14, further comprising a relief pattern produced by a laser through the transparent layer.

* * * * *